(12) United States Patent
Edgar et al.

(10) Patent No.: X8862
(45) Date of Patent: Jun. 6, 1835

(54) THRASHING MACHINE, PORTABLE

(76) Inventors: Hugh Edgar; Isaac W. Edgar

Hugh Edgar & Isaac M. Edgar
Baughman Township Wayne
County Ohio.

Letters Patent

The Schedule referred to in these Letters patent and making part of the same containing a description in the words of the said Hugh Edgar and Isaac M Edgar themselves of their improvement in the portable Grain Thrasher To all to whom these presents shall come:

Be it known that we Hugh Edgar and Isaac M. Edgar of Baughman Township in the County of Wayne and State of Ohio have invented a new and useful improvement in the portable grain Thrasher and that the following is a full and exact description of the construction and operation of the said portable Grain Thrasher as invented by us. The Horse power is constructed in the following manner viz: two sills 14 feet long 6 inches wide 4 ins thick at one end and 3 ins at the other are placed with the edge up 2 feet apart at the largest end and about 2 ins apart at the small end, a cross sill at feet long 6 ins wide and 4 ins thick is framed into the underside of the long sills 2 feet 2 ins from the wide end and secured by screw Boltz. Two other short cross sills are framed into the long sills. the first is 4 by 6 ins in size and framed into the long sills 4 feet 3 & 1/2 ins from the wide end. the other same size framed in with the edge up 5 feet 6 ins from the wide end of the long sills. A cross piece is framed on the wide end of the long sills about 3 feet long 4 ins thick and 12 ins wide with the edge up let down one inch into the sills and secured at each end by screw Boltz passing up through both United States Patent Patent No.: X8862 another cross piece of sufficient length to extend to the outsides
of the long sills 3 ins thick at the top and as much thick
er at the bottom as the Build may think necessary to brace
against the action of the Horses. same width framed into
the Sills and secured in the same manner as the other.
Two caps are framed on the top of these pieces, one on each side
of the center lengthwise. they are about 6 feet 8 ins in length
3 ins thick 8 ins wide above the center of the long cross sill
and 6 ins wide at each end let down into the cross pieces
one inch and secured at each end by screw Bolts passing
up through both. The main Shaft is made of wood about 21
ins in length and one foot square a step Gudgeon of suit-
able size is inserted into the center of the lower end of the
Shaft which runs in a cast iron step, placed in the center
of the long cross sill (before described) one foot of the lower
end of the Shaft is square to receive the master Wheel,
then a Neck or journal 3 ins long and nine inches di-
ameter to receive the Caps. the remaining 6 ins of the shaft
extends above the caps to receive the lever Wheel. a circular
aperture is cut in the Caps one half in each. 9 inches in
diameter which receives the journal on the main Shaft &
made permanent by a screw bolt passing through the cap
near the shaft. the shaft stands in a verticle position. the
Lever Wheel is made circular about 2 feet 9 ins in dia. made
of 2 thicknesses of 1 & 1/2 or 2 inch plank. the grain of one
thickness crossing the grain of the other and secured together
with pins. a mortice 10 ins square is made through the
centre to receive the top of the shaft. large wrough Iron
staples are placed in this wheel to receive the levers to which
the Horses are attached. the Horses attached to the levers
from 9 to 10 feet from the centre of the main shaft. The mas
ter wheel is made of 2 thicknesses of 1 & 1/2 inch plank and a
rim 2 & 1/2 inches thick. the rim is 3 feet 10 inches diam.

ter. and 6 ins wide placed in the centre with the one &
1/2 inch plank. on each side of the wheel filling a circle of
4 feet diameter except one half inch of the inner surfaces
of the 1 & 1/2 inch plank on each side of the rim. which is
cut to the size of the rim leaving one inch thick on each
side of the wheel to project one inch beyond the rim which
forms a groove to receive the segments of cast iron 3 & 1/2 in
ches wide. a mortice 13 ins square is made through the
center of this wheel to receive the shaft and 4 pieces of timber the
same thickness of the rim are placed round the mortice, and
between the surfaces, and the whole pinned together in a
permanent manner. the Wheel is secured on the shaft
in the usual way. The cast iron which surrounds the
master wheel is put on in segments of one eleventh part
of the sircumference one inch thick and 3 & 1/2 ins wide
and might be termed a curved plate with 5 equal sized
and equal spaced mortises each mortise 1 & 1/2 in. in size
across the plate or segment 1 & 1/2 ins on the outside and
3/4 of an inch in size on the inside of the segment length
wise. secured to the rim by spikes passing through holes
in the solid part of the segment and into the rim. The
second shaft is of wrought Iron 2 ins square one foot
between the journals. the upper journal 2 ins long and
2 ins dia. and runs in a plummer Box which is set
into one of the Caps (before described) and secured by screw
bolts in the usual manner. the lower end is the same
size and shape of the step Gudgeon in the main shaft
and runs in a step from the same pattern which is
placed in the first short cross sill (before described)
On this shaft there is a pinion of cast iron 1 & 1/2 ins thick
& 8 1/2 ins diameter with 10 cogs made of suitable size and
shape to work into the mortises described in the segment
of the master wheel on the same shaft and below the pinion there is a bevil wheel 28 ins dia. which consists
of a rim about 3 & 1/2 ins wide made level on the upper
sides about 3/4 of an inch thick at the verge and bevilled
to an angle to suit the size of the pinion which is 8 ins
dia. giving it this form makes the rim considerably
thicker in the inside than at the verge and gives strength
and proportion to the wheel. the bevilled face of this rim
contains 56 mortices of equal size and shape about 2
ins in length across the rim and one inch in size
in the centre lengthwise. the mortises extend through the
rim but are less on the upper or bevil side which
strengthens the space between them. the wheel is com-
pleted by a center and arms of proportional size.
A traveller 3/4 of an inch thick and about 8 ins dia. runs
on the upper surface of the bevil wheel near the verge
and above the bevil pinion. it revolves on an iron ax-
le which is supported by the cross piece of the frame. The
bevil pinions is 8 in dia and 2 ins thick with 16 cogs
of suitable size and shape to work in the mortises des-
cribed in the bevil wheel and is placed on the end of
the line shaft. The line shaft is placed between the long sill
from the last short cross sill to the small end about 7 feet long
made of 1 & 1/2 inch square bar Iron with 2 journals 1 & 1/2 in
dia. and 2 in. in length. one of the journals on the end on
which the pinion is placed and the other about 6 ins from the
end both run in cast iron Boxes the end that projects beyond
the box is made of suitable size and shape to receive the tum-
bling shaft the small end of the sills made permanent by
a screw bolt passing through them and confining them to the box
which is let in between them. The machine consist of posts
girts. side pieces. Caps concaves feed Apron concave apron cylin
der. Cylinder Caps and spur wheels and pinions. There are 4
posts 2 of which are 3 ins thick by 4 ins wide the other 2 the same thickness 15 ins of the lower ends of them 10 ins wide and
the upper ends 8 ins wide the sides of the posts placed to the back
and front of the frame. There are 2 bottom side girts 2 feet 6 ins
long between the posts framed into them 8 ins from the bottom,
one of them 2 by 6 ins in size is framed to the inside of the narrow
posts the other girt same thickness. one half of it same width
and the other half 10 ins wide framed in 2 ins from the inside
of the wide posts. the wide end placed to the front of the frame
a side piece of the same dimensions as the last named girt, is
framed into the out edge of the wide posts the same distance from
the bottom as the girts let into the posts one inch and secured to
them with screw bolts. Two girts in which the concave is placed
are framed into the posts one inch above the top of the lower side
Girt. they are 2 ins thick 3 & ½ ins wide at the front end and
16 at the back end and framed to the inside of the posts. the
mortises which receive the back end made longer than the width of
the tenon to receive keys for the purpose of regulating the distance
between the cylinder and concave to suit the different condition of the
grain. The upper side Girts are 3 by 4 ins in size framed to the inside
of the posts 18 ½ ins above and parallel with the inclined surface of
the concave girts. the upper side piece same size framed one inch
into the outside of the wide posts. the surface of the side piece has the
same inclination and placed the same hight as the upper side girts
and secured to the posts with screw bolts. Two cross Girts 2 by 3 ins
in size are framed into the back of the frame one of them 3 inches
from the bottom and the other 14 and one the same size framed
into the front of the frame 3 ins from the bottom. Two caps are
framed across on the tops of the posts one on the front and the other
on the back which completes the frame. The front part of the frame
2 feet 6 in and the back part 3 feet 2 in high. The concave is
composed of 6 bars of ¾ inch square bar iron and 5 bars of flat
iron or wood 2 ins wide. the square bars are placed with upper
angles toward the centre of the cylinder. the horizontal angles placed on a circle of 21 1/2 ins dia described from the center of the Cylin
der on the inside of the Concave girts. the flat Bars are placed with
upper surface on the same circle and placed alternately between the
square bars. The shaft of the Cylinder 1 3/2 in square bar iron, 35
ins long the shaft has 3 journals each 2 ins long and 1 1/4 ins
dia one on each end and one 7 ins from one end and 2 ins from
the other end. the long end to receive the Cylinder and the short end
receives a pinion with which it is propelled. the Cylinder is made
with 3 heads or blocks one at each end and one in the middle
made of 2 thicknesses of inch Boards 18 ins dia pinned together with
the grain of one thickness crossing the grain of the other. a centre is
made of Cast iron of suitable size to fit the shaft with flanges
on the outside. the centres extend through the heads. the flanges are
let into the outside of them, and the heads secured to the flanges with
rivets. 8 bars of 5/8 square bar iron are placed equi-distant round
the surface of the heads, with the angle out projecting 2/3 of an inch
above the surface of the heads and 8 pieces of band iron 24 1/2 ins
wide and 1/4 of an inch thick are placed alternately between them
they are so shaped that 1 1/2 ins of the width of them are placed
with the flat side on the surface of the heads. and the remain-
ing inch of the width turned to project in a straight line from
the centre of the Cylinder and cut in the teeth square at the
point wide and strong at the bottom of the projecting part of
the bar. the teeth in one bar follows the space in the other al
ternately the teeth projecting 1/3 of an inch above the square bars
which makes the Cylinder 20 in dia a band of iron over
all the bars at each end completes the cylinder. the centre
of the Cylinder is placed on the upper side girts and side
piece 16 ins from the back of the frame and is covered with
a semicircular cap with an aperture in the front part of
it through which the dust from the straw is discharged.
The feed apron is about 3 feet long. the lower end of it rests on
the upper edge of the concave. The upper end is supported by

United States Patent

Patent No.: X8862 staples and hooks, connected with screw bolts through the ends of the
back caps so that the apron might be removed at pleasure, The
concave apron extends from the front part of the concave to the front of the frame where the grain and
straw are discharged. The Cylinder pinion is about 4 ins dia. pro-
pelled by a spur wheel 20 in dia which is placed on a shaft 5 in
long between the journals. This shaft is placed in the wide part of
the lower side Girt and side piece of the same dimensions about
13 ins from the front of the frame. There is also on this shaft a
5 inch pinion which is propelled by the ratchet wheel which is also
20 ins dia and is placed on a 1 1/2 inch shaft which is 34 ins be-
tween the journals, the journals each 2 ins long and 1 1/2 ins dia
with about 4 ins on the outside of the journals at each end made
tapering (to receive the tumbling shaft) This shaft is hung in the
lower side girt on one side and the narrow end of the lower side
piece, on the other side and placed so as to work into the pinion
on the short shaft. The machine is connected to the Horse power
by a tumbling shaft. which is made of wood or iron as the builder
may chose. if made of wood it is about 3 1/2 ins dia, and about
10 feet long 2 pieces of iron half an inch thick are secured on each
side of the shaft at the end with bands, and project 3 1/2
ins beyond the wood with holes in the end to receive pins which
are made on the angles of a piece of iron 3 1/2 ins square and
3/8 of an inch thick. another piece of iron 2 ins wide. one inch
thick in the middle, and thinner at the ends. a square hole
is made in the centre to receive the ratchet wheel shaft or line shaft.
with holes in each end 4 ins from the centre to receive the pins on
the contrary angles of the iron before described. the ends turned
round and closed on the pins which complete the ratchet joint.
both ends are made alike.

Improvements claimed — We claim as our improvements, the pecu-
liarly simple and substantial construction of the frame of the Horse
Power and Machine. The cheap and durable form of the master
wheel. The proportionate shape of the bevel wheel which gives it greater strength in proportion the weight than the usual plan.
The square pieces of iron with pins on the corners in ratchet
joint which are easier made, more substantial. and works with
less friction at a great angle. than those used heretofore. The
form of the bar and the bar tooth cylinder. the teeth of which
are not liable to fly out with the centrifugal force of the cylin
der when in motion. Placing wood or flat bars between the square
bars in the concave which leaves greater space for the grain
and straw to pass. The regulating the concave to or from the
Cylinder with Keys to suit the state of the ~~state of the~~ grain.
The ratchet wheel shaft passing through the machine so that
the tumbling shaft may be attached to either end to suit
different situations Placing half the gearing in the machine
which reduces the motion of the tumbling shaft and simplifies
the Horse Power Witnesses
Alex M. Cully
Thomas W. Waldron Hugh Edgar
Isaac W. Edgar 6x2.
hJW.

3133 [illegible]